(12) United States Patent
Mancusi, III

(10) Patent No.: US 10,729,991 B2
(45) Date of Patent: Aug. 4, 2020

(54) COMPACT CROSS-FLOW CONTACTOR

(71) Applicant: 3M INNOVATIVE PROPERTIES COMPANY, St. Paul, MN (US)

(72) Inventor: Anthony W. Mancusi, III, Charlotte, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 378 days.

(21) Appl. No.: 15/580,227

(22) PCT Filed: Jun. 20, 2016

(86) PCT No.: PCT/US2016/038316
§ 371 (c)(1),
(2) Date: Dec. 6, 2017

(87) PCT Pub. No.: WO2016/209755
PCT Pub. Date: Dec. 29, 2016

(65) Prior Publication Data
US 2018/0133620 A1    May 17, 2018

Related U.S. Application Data

(60) Provisional application No. 62/182,719, filed on Jun. 22, 2015.

(51) Int. Cl.
*B01D 53/22* (2006.01)
*B01D 19/00* (2006.01)
(Continued)

(52) U.S. Cl.
CPC ..... *B01D 19/0031* (2013.01); *B01D 19/0005* (2013.01); *B01D 61/28* (2013.01);
(Continued)

(58) Field of Classification Search
CPC .............. B01D 63/02; B01D 2313/125; B01D 2313/10; B01D 61/28; B01D 19/0031;
(Continued)

(56) References Cited

U.S. PATENT DOCUMENTS 3,934,982 A * 1/1976 Arp ..................... A61M 1/1698
422/48
5,137,531 A * 8/1992 Lee ..................... A61M 1/1698
128/DIG. 3
(Continued)

FOREIGN PATENT DOCUMENTS

WO    WO 2006/044255    4/2006

OTHER PUBLICATIONS

International Search Report for PCT/US2016/038316, dated Oct. 6, 2016, (4 pages).

*Primary Examiner* — Anthony R Shumate
(74) *Attorney, Agent, or Firm* — Scott A. Baum

(57) ABSTRACT

A membrane contactor for degassing a gas-entrained liquid and to discharge gas-depleted liquid includes: a shell has two ends; a cap closes one shell end; a membrane extends between the shell ends and is enclosed within the shell; a first center tube discharges the gas-entrained liquid into the membrane; a second center tube discharges the gas-depleted liquid from the contactor; and one tube surrounds the other tube. The membrane may be a flat sheet membrane or a hollow fiber membrane. The cap has an inlet in fluid communication with the first center tube and an outlet in fluid communication with the second center tube. A baffle may be located within the membrane between the shell ends.

12 Claims, 2 Drawing Sheets

(51) Int. Cl.
   *B01D 63/02*     (2006.01)
   *B01D 61/28*     (2006.01)
   *B01D 63/08*     (2006.01)

(52) U.S. Cl.
   CPC ............ *B01D 63/02* (2013.01); *B01D 63/08* (2013.01); *B01D 63/085* (2013.01); *B01D 2313/08* (2013.01); *B01D 2313/10* (2013.01); *B01D 2313/105* (2013.01); *B01D 2313/12* (2013.01); *B01D 2313/125* (2013.01)

(58) Field of Classification Search
   CPC .......... B01D 2313/12; B01D 2313/105; B01D 19/0005; B01D 63/085; B01D 2313/08; B01D 63/08
   See application file for complete search history.

(56) References Cited

U.S. PATENT DOCUMENTS

| | | |
|---|---|---|
| 5,162,101 A * | 11/1992 | Cosentino ........... A61M 1/1698 128/DIG. 3 |
| 5,186,832 A | 2/1993 | Mancusi |
| 5,264,171 A | 11/1993 | Prasad |
| 5,284,584 A | 2/1994 | Huang |
| 5,352,361 A | 10/1994 | Prasad |
| 5,695,545 A | 12/1997 | Cho |
| 6,149,817 A | 11/2000 | Peterson |
| 8,070,947 B2 * | 12/2011 | Baba ...................... B01D 63/02 210/321.69 |
| 2002/0195385 A1 | 12/2002 | Cho |
| 2004/0004037 A1 * | 1/2004 | Herron .................. A61K 31/70 210/321.83 |
| 2005/0218064 A1 * | 10/2005 | Sengupta ........... B01D 19/0031 210/321.89 |
| 2007/0107601 A1 | 5/2007 | Laverdiere |
| 2012/0247337 A1 * | 10/2012 | Taylor ................ B01D 19/0031 96/6 |
| 2012/0308434 A1 * | 12/2012 | Kawamura ......... A61M 1/1698 422/46 |
| 2013/0247760 A1 | 9/2013 | Taylor |
| 2018/0065090 A1 * | 3/2018 | Christou ................ B01D 63/02 |
| 2018/0093226 A1 * | 4/2018 | Taylor .................... B01D 35/30 |

\* cited by examiner

COMPACT CROSS-FLOW CONTACTOR

CROSS REFERENCE TO RELATED APPLICATIONS

This application is a national stage filing under 35 U.S.C. 371 of PCT/US2016/038316, filed Jun. 20, 2016, which claims the benefit of US Provisional Patent Application No. 62/182,719, filed Jun. 22, 2015, the disclosures of which are incorporated by reference in their entirety herein.

FIELD

In accordance with at least selected embodiments, the present disclosure is directed to novel or improved membrane contactors.

BACKGROUND

Membrane contactors are devices used to, among other things, degas liquids. For example, membrane contactors may be used to degas boiler water.

Membrane contactors typically operate on a diffusion principle. Hollow fiber membrane contactors typically have a shell side and a lumen (or tube) side, and these sides are separated with a membrane, for example, a microporous membrane. In operation, the gas-entrained liquid is introduced into one side of the contactor, while vacuum or a combination of vacuum and sweep gas or a gas depleted liquid is passed through the other side. As the liquid passes through its side, the gas diffuses across the membrane into the other side.

Such membrane contactors are known, for example, see: U.S. Pat. Nos. 5,264,171; 5,352,361; 5,186,832; 5,284,584; & 5,695,545, each of which is incorporated, in its entirety, herein by reference. For example, in FIG. 1 (FIG. 7 from U.S. Pat. No. 5,264,171), gas-entrained liquid enters the contactor at inlet 15, exits the perforated center tube 12, flows over the exterior surfaces of the hollow fibers 1 (the gas-entrained liquid is degassed as it passes over the hollow fibers) and around the baffles 20a/b, back into the perforated tube 12, and exits the contactor via outlet 17 (this is a shell side path). As the liquid is passing over the hollow fibers, the lumens of the hollow fibers are evacuated (vacuum) or subject to vacuum and sweep gas introduced via inlets 18/19. These are excellent contactors and such Liqui-Cel® brand contactors are available from the Membrana—Charlotte Division of Celgard, LLC of Charlotte, N.C. The configuration, i.e., with the inlet 15 and outlet 17 at opposite end of the contactor, can limit the placement (or piping configuration) of the contactor for certain applications.

Accordingly, there is a need for a membrane contactor that can be easily used in limited spaces.

SUMMARY OF THE INVENTION

In accordance with at least selected embodiments, aspects or objects, the present disclosure or invention may address the above need for a membrane contactor that can be easily used in limited spaces, and/or provides novel or improved membrane contactors, compact membrane contactors, dual center tube membrane contactors, compact cross-flow membrane contactors, and/or compact cross-flow hollow fiber membrane contactors, and/or related methods of manufacture and/or use. In accordance with at least certain embodiments, the present disclosure is directed new or improved contactors and/or methods for degassing a gas-entrained liquid and to discharge gas-depleted liquid. In accordance with at least particular embodiments, the present disclosure is directed new or improved compact cross-flow contactors including: a shell having two ends; a first cap closing one shell end; a membrane extending between the shell ends and is enclosed within the shell; a first center tube discharging the gas-entrained liquid into a portion of the membrane (for example, the shell side of a plurality of hollow fibers); a second center tube discharging the gas-depleted liquid from the contactor; and one tube surrounds at least a portion of the other tube. The membrane may be a flat sheet membrane or a hollow fiber membrane. The first cap has an inlet in fluid communication with the first center tube and an outlet in fluid communication with the second center tube. One or more baffles may be located within the membrane between the shell ends. A second cap closing the other shell end and having a first port (inlet or outlet) in fluid communication with another portion of the membrane (for example, the lumen side of a plurality of hollow fibers). The first cap having a second port in fluid communication with the other end of another portion of the membrane (for example, the lumen side of a plurality of hollow fibers). The first and second ports adapted to carry air, vacuum, sweep gas, vacuum and sweep gas, and/or gas-depleted liquid.

In a preferred membrane contactor embodiment for degassing a gas-entrained liquid and to discharge gas-depleted liquid: a shell has two ends; a cap closes one shell end; a membrane extends between the shell ends and is enclosed within the shell; a first center tube discharges the gas-entrained liquid into the membrane; a second center tube discharges the gas-depleted liquid from the contactor; and one tube surrounds the other tube. The membrane may be a flat sheet membrane or a hollow fiber membrane. The cap has an inlet in fluid communication with the first center tube and an outlet in fluid communication with the second center tube. A baffle may be located within the membrane between the shell ends.

DESCRIPTION OF THE DRAWINGS

For the purpose of illustrating the invention, there is shown in the drawings a prior device and a form that is presently preferred; it being understood, however, that this invention is not limited to the precise arrangements and instrumentalities shown.

DESCRIPTION OF THE INVENTION

Figure 1:
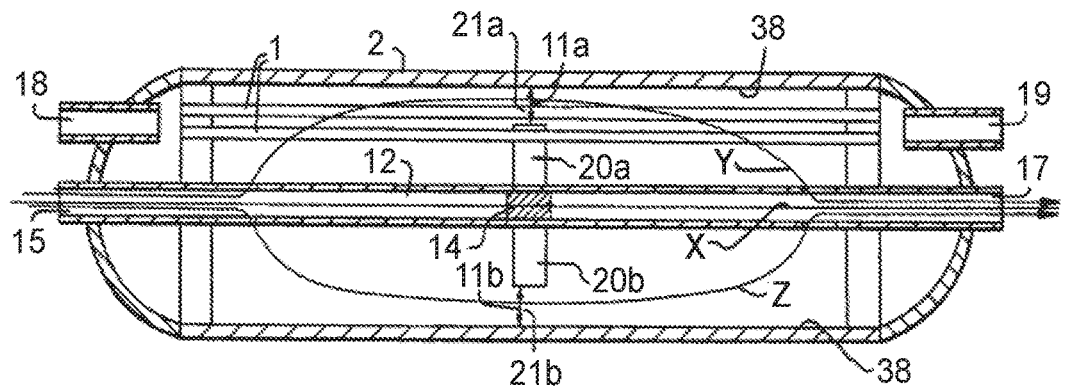
FIG. 1 is FIG. 7 from U.S. Pat. No. 5,264,171 (prior art).
Figure 2:
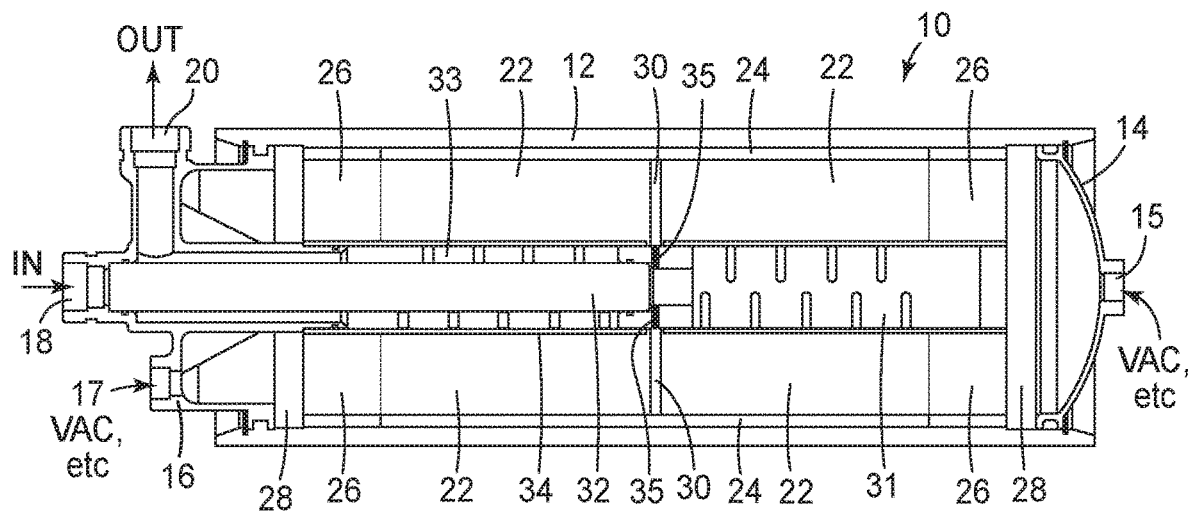
FIG. 2 is an embodiment of the instant invention.

Referring to FIG. 2, an exemplary embodiment of the inventive contactor 10 is illustrated. Contactor 10 may generally include: a shell 12 with two ends, caps 14/16 closing the shell ends, and a membrane 22 extending between the shell ends. The contactor 10 includes a shell side and a lumen side (discussed in greater detail below).

Shell 12 may be cylindrical body made of any material, e.g., plastic, metal, fiber composite, or combinations thereof.

Cap 16 closes the proximal end of the shell 12. Cap 16 may include an inlet 18 and an outlet 20. Gas-entrained liquid is introduced into the contactor 10 via inlet 18, and gas-depleted liquid is discharged via outlet 20 (this will be explained in greater detail below). Cap 16 may also include a first port (inlet or outlet) 17 in communication with a source of vacuum or vacuum/sweep gas and the membrane 22 via head space 28 (discussed below). Port 17 may be used instead of (or with) the second port (outlet or inlet) 15 of cap 14 (discussed below). The sweep gas may be any sweep gas and is usually chosen depending upon the gas to be removed from the liquid. In some embodiments, the sweep gas may be nitrogen ($N_2$). Alternatively, a gas-depleted liquid may be used instead of the vacuum or vacuum/sweep gas.

Figure 3:
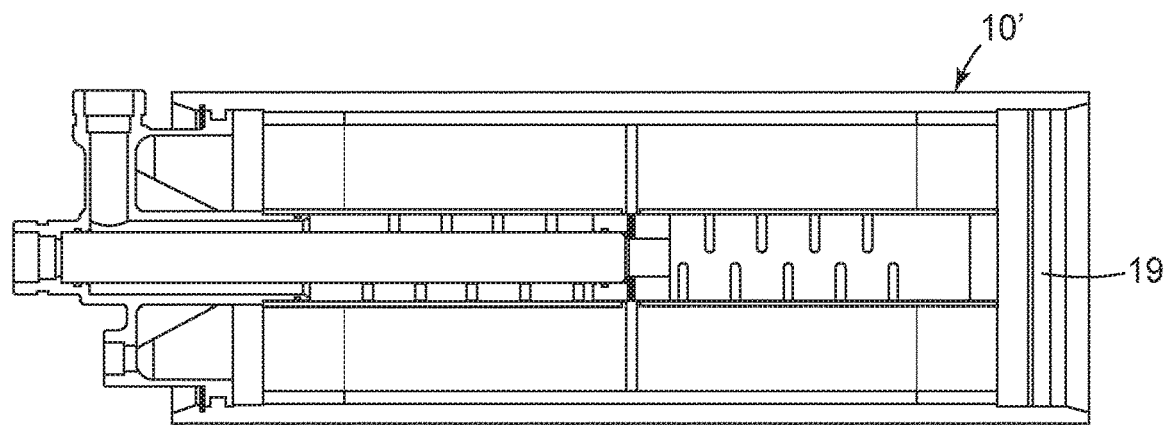
FIG. 3 is an embodiment of the instant invention.
Figure 4:
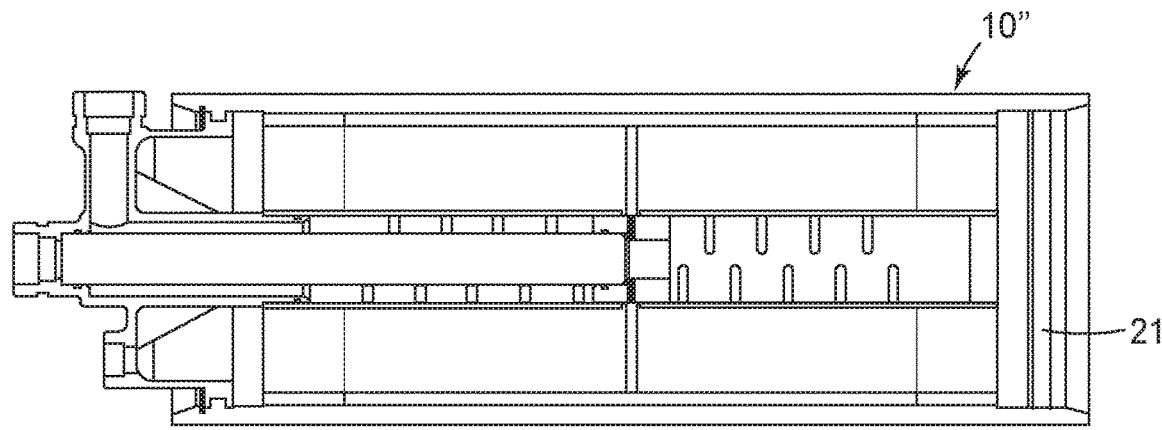
FIG. 4 is an embodiment of the instant invention.
Figure 5:
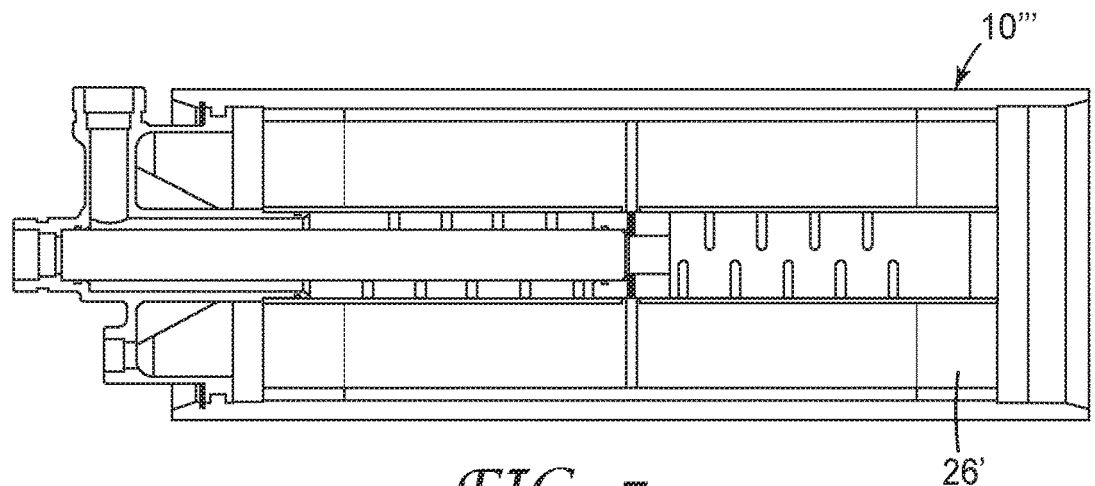
FIG. 5 is an embodiment of the instant invention.

In one embodiment (FIG. 2), cap 14 closes the distal end of the shell and may include port 15. Port 15 may be in communication with a source of vacuum or vacuum/sweep gas and the membrane 22 via head space 28 (discussed below). The sweep gas may be any sweep gas and is usually chosen depending upon the gas to be removed from the liquid. In some embodiments, the sweep gas may be nitrogen ($N_2$). Alternatively, a gas-depleted liquid may be used instead of the vacuum or vacuum/sweep gas. In another embodiment 10' (FIG. 3), cap 14 may be eliminated and the distal open end of shell 12 is simply closed in a fluid tight manner, for example with wall 19. In another embodiment 10" (FIG. 4), end cap 14 is replaced with an air filter 21 (such as a circular air filter serving as a large air inlet). In yet another embodiment 10''' (FIG. 5), cap 14 may be eliminated and the hollow fiber in end wall 26' are closed shut by the material of end wall 26'. In those embodiments, vacuum and/or vacuum/sweep gas or gas-depleted liquid is drawn through port (outlet) 17 of cap 16 (discussed above).

Caps 14 and 16 are sealed to shell 12 in any fluid tight manner, e.g., welding, gluing, or mechanically (e.g., O-rings).

Membrane 22 is enclosed within shell 12 between, for example, the caps 14 and 16. Membrane 22 may be any type of gas-separation membrane. Membrane 22 may be a flat sheet or hollow fiber. Membrane 22 may be a microporous membrane. In one embodiment, membrane 22 is a plurality of microporous hollow fibers (or bundle of hollow fibers) with end walls 26 at each end of the bundle. End walls 26 may be made of any material, e.g., thermoplastic material or potting (e.g., polyolefin and/or polyamide) or thermosetting material (e.g., epoxy and/or polyurethane). When hollow fibers are used, the ends of the hollow fibers (i.e., ends are adjacent the head space 28) may be open at one or both ends, so that the lumens of the hollow fibers may be in fluid communication with the vacuum or vacuum/sweep gas or gas-depleted liquid via head space 28. (mentioned above). Hollow fiber ends may be closed by sealing or may be buried in the end wall 26.

Shell space 24 is located between the membrane 22 and the interior surface of the shell 12. In the embodiment shown, the end walls 26 extend beyond the membrane 22 to engage the interior surface of the shell 12 in a fluid tight fashion to form shell space 24. This engagement with shell 12 is not so limited, and may include spacers, glue, welds, or mechanical seals (e.g., O-rings), so long as the fluid tight seal is achieved. Shell space 24 is provided to allow the gas-entrained liquid to move over the external surfaces of the membrane 22 and over baffle 30.

Head space 28 is located between end wall 26 and cap 14/16. The membrane 22 may be open (i.e., in fluid communication) into either or both head space 28 (discussed in greater detail below). Head space is sealed (or fluid tight), in any conventional fashion, e.g., welding, gluing, or mechanically (e.g., O-rings) between the end walls 26 and cap 14/16.

Baffle 30 may be located within the membrane 22. Baffle 30 is used to distribute the gas-entrained liquid over the membrane to facilitate depletion of the gas from the liquid. One or more baffles may be provided. Baffle 30 may be located at any point between end walls 26. In one embodiment, the baffle may be a single baffle located between (e.g., the mid-point) the end walls 26. Baffle 30 may be made of any material, e.g., thermoplastic material (e.g., polyolefin and/or polyamide) or thermosetting material (e.g., epoxy and/or polyurethane).

A preferred dual or concentric center tube system has a first center tube 32 and a second center tube 34. This concentric center tube system is used to introduce gas-entrained liquid into the contactor 10 and to discharge gas-depleted liquid from the contactor 10, via, for example, the inlet 18 and outlet 20 of cap 16. It being understood in-flow and out flow of liquid through the contactor 10 may be reversed. While these tubes are discussed as concentric, they are not so limited.

In the exemplary embodiment (FIG. 2), second center tube 34 is a perforated center tube 34 that extends between end walls 26. Center tube 34 has a distal portion 31 and a proximal portion 33. Distal portion 31 may be separated from proximal portion 33 by wall or spacer 35. Wall 35 may be placed anywhere between end walls 26 (in FIG. 2 it is midway between the end walls 26). In an embodiment, all or part of center tube 34 may be a plastic or wire mesh material. In another embodiment, the distal end of the center tube 34 may be omitted. In yet another embodiment, the second center tube 34 may be omitted.

The first center tube 32 is in fluid communication with the inlet 18 and distal portion 31. In the embodiment shown, tube 32 extends to wall 35. Tube 32 discharges gas-entrained liquid into the distal portion 31 of the center tube 34. The gas-entrained liquid exits the distal portion 31 and travels over membrane 22 where it is de-gassed.

The second center tube 34 is in fluid communication with the outlet 20 and proximal portion 33. Gas-depleted liquid from membrane 22 enters tube 34 via the proximal portion 33 of center tube 34, and is discharged from the contactor 10 via outlet 20.

It is understood that in the forgoing discussion of the concentric tube system, liquid flow may be reversed and the positions of the proximal and distal ends may also be reversed.

In a possibly preferred or exemplary operation, gas-entrained liquid is introduced into contactor 10 via inlet 18, the gas-entrained liquid travels through the first center tube 32 and is distributed into the membrane 22. The gas-entrained liquid travels over the external surfaces of the membrane 22 (for example, the shell sides of hollow fibers), around baffle 30 into shell space 24, back into membrane 22, into the second center tube 34, and is discharged via outlet 20 (this path is the external or shell side). Simultaneously, vacuum (or the combination of vacuum and sweep gas, or a gas depleted liquid) is drawn through ports 15 and/or 17, through head space 28, and from the membrane 22, if the membrane is a bundle of hollow fibers, vacuum is drawn from the lumens (this path is the lumen or interior side). Entrained gas is removed from the liquid across the membrane 22. In one embodiment, port 15 is open, vacuum is applied to port 17, and air is drawn through the lumens of the membrane 22. In another embodiment, port 17 is open, vacuum is applied to port 15, and air is drawn through the lumens of the membrane 22. In yet another embodiment, vacuum is applied to both ports 15 and 17, and gas is drawn through the lumens of the membrane 22. Air, sweep gas, vacuum, sweep gas and vacuum, or gas-depleted liquid can be used in the lumens via ports 15 and/or 17 to pull gas from the shell side liquid (to degas the shell side liquid).

In a reverse flow embodiment gas-entrained liquid is introduced into contactor 10 via the outlet 20, and the gas-entrained liquid travels through the second center tube 34 and is distributed into the membrane 22. The gas-entrained liquid travels over the external surfaces of the membrane 22 (for example, the shell sides of hollow fibers), around baffle 30 into shell space 24, back into membrane 22, into the first center tube 32, and is discharged via inlet 18 (this path is the external or shell side).

Simultaneously, vacuum (or the combination of vacuum and sweep gas, or a gas depleted liquid) is drawn through ports 15 and/or 17, through head space 28, and from the membrane 22, if the membrane is a bundle of hollow fibers, vacuum is drawn from the lumens (this path is the lumen or interior side). Entrained gas is removed from the liquid across the membrane 22. In one embodiment, port 15 is open, vacuum is applied to port 17, and air is drawn through the lumens of the membrane 22. In another embodiment, port 17 is open, vacuum is applied to port 15, and air is drawn through the lumens of the membrane 22. In yet another embodiment, vacuum is applied to both ports 15 and 17, and gas is drawn through the lumens of the membrane 22. Air, sweep gas, vacuum, sweep gas and vacuum, or gas-depleted liquid can be used in the lumens via ports 15 and/or 17 to pull gas from the shell side liquid (to degas the shell side liquid).

In a possibly preferred embodiment, a shell side liquid hollow fiber membrane contactor for degassing a gas-entrained liquid and to discharge gas-depleted liquid is a compact cross-flow contactor including: a shell having two ends; a first cap closing one shell end; a membrane extending between the shell ends and is enclosed within the shell; a first center tube discharging the gas-entrained liquid into a portion of the membrane (for example, the shell side of a plurality of hollow fibers); a second center tube discharging the gas-depleted liquid from the contactor; and one tube surrounds at least a portion of the other tube. The membrane may be a flat sheet membrane or a hollow fiber membrane. The first cap has an inlet in fluid communication with the first center tube and an outlet in fluid communication with the second center tube. One or more baffles may be located within the membrane between the shell ends. A second cap closing the other shell end and having a first port (inlet or outlet) in fluid communication with another portion of the membrane (for example, the lumen side of a plurality of hollow fibers). The first cap having a second port in fluid communication with the other end of another portion of the membrane (for example, the lumen side of a plurality of hollow fibers). The first and second ports adapted to carry air, vacuum, sweep gas, vacuum and sweep gas, and/or gas-depleted liquid.

The present invention may be embodied in other forms without departing from the spirit and the essential attributes thereof, and, accordingly, reference should be made to the appended claims, rather than to the foregoing specification, as indicated the scope of the invention.

I claim:

1. A membrane contactor comprising:
    a plurality of microporous hollow fibers forming a bundle with an end wall located at each end of the bundle, and at least one end of the plurality of microporous hollow fibers being open;
    a shell with a first end and a second end enclosing the bundle, and the end walls of the bundle engaging an interior surface of the shell in a fluid tight fashion forming a shell space located between the bundle and the interior surface of the shell;
    a first cap located on the first end of the shell having an inlet and an outlet;
    a first center tube extending from the first cap having a distal portion, the first center tube located inside of a second center tube and in fluid communication with the inlet;
    the second center tube extending from the cap through the bundle between the end walls;
    the second center tube is perforated and in fluid communication with the outlet and comprises a wall located between the end walls of the bundle creating a distal portion and a proximal portion of the second center tube; and
    wherein the distal portion of the first center tube extends through the wall of the second center tube to discharge into the distal portion of the second center tube.

2. The membrane contactor of claim 1 wherein the second end of the shell comprises a headspace located between the end wall of the bundle and a second cap having a port.

3. The membrane contactor of claim 1 wherein the second end of the shell is closed in a fluid tight manner with a wall.

4. The membrane contactor of claim 1 wherein the second end of the shell comprises an air filter.

5. The membrane contactor of claim 1 wherein the first cap comprises a port in fluid communication with a headspace located between the end wall of the bundle and the first cap.

6. The membrane contactor of claim 2 wherein the first cap comprises a port in fluid communication with a headspace located between the end wall of the bundle and the first cap.

7. The membrane contactor of claim 3 wherein the first cap comprises a port in fluid communication with a headspace located between the end wall of the bundle and the first cap.

8. The membrane contactor of claim 4 wherein the first cap comprises a port in fluid communication with a headspace located between the end wall of the bundle and the first cap.

9. The membrane contactor of claim 1 comprising a baffle located within the bundle between the end walls.

10. The membrane contactor of claim 9 wherein a single baffle is located at a mid- point between the end walls of the bundle.

11. The membrane contactor of claim 1 wherein the wall of the second center tube is located midway between the end walls of the bundle.

12. The membrane contactor of claim 10 wherein the wall of the second center tube is located midway between the end walls of the bundle.

* * * * *